United States Patent [19]

Matsuki et al.

[11] Patent Number: 4,770,534
[45] Date of Patent: Sep. 13, 1988

[54] COLOR INDICATION COMPARISON METHOD

[75] Inventors: Hiroshi Matsuki, Hoya; Kiyoshi Chaki, Tama; Takao Sumiyoshi, Suginami, all of Japan

[73] Assignee: Suga Test Instruments Co., Ltd., Tokyo, Japan

[21] Appl. No.: 842,847

[22] Filed: Mar. 24, 1986

[30] Foreign Application Priority Data

Mar. 27, 1985 [JP] Japan .................................. 60-64691

[51] Int. Cl.$^4$ ............................................... G01J 3/46
[52] U.S. Cl. ..................................................... 356/405
[58] Field of Search ................. 356/405, 406; 364/526

[56] References Cited

U.S. PATENT DOCUMENTS 2,483,452 10/1949 Berkley .............................. 356/405
3,504,980 4/1970 Bentley et al. ..................... 364/526
4,623,973 11/1986 Hoffrichter et al. ............... 364/526

*Primary Examiner*—F. L. Evans
*Attorney, Agent, or Firm*—Wenderoth, Lind & Ponack

[57] ABSTRACT

A method of determining the color difference between two similar colors including the steps of determining the tristimulus values for a reference color with which another color is to be compared, providing a planar chromaticity diagram for the values other than brightness in which the values for the reference colors are at the origin and the abscissa and ordinates of the diagram, determining the hue of the reference color and plotting in said diagram an equi-hue line, determining the tristimulus values for the other color to be compared to the reference color and plotting the values other than brightness on the diagram, plotting an equi-saturation line on the diagram perpendicular to the equi-hue line and extending through the origin, plotting lines parallel to the equi-hue and equi-saturation lines through the position of the plotted values for the other color and extending across the equi-hue and equi-saturation lines, so that the difference in the tristimulus values for the other color from the reference color are shown by measurements along said parallel lines. In addition, a brightness line is provided having the brightness value of the reference color at the center of the line with values of greater brightness on one side of the center and values of less brightness on the other side of the center, and plotting the brightness of the other color on the line, whereby the difference in brightness for the other color from the reference color is shown by measurement along the line.

1 Claim, 1 Drawing Sheet

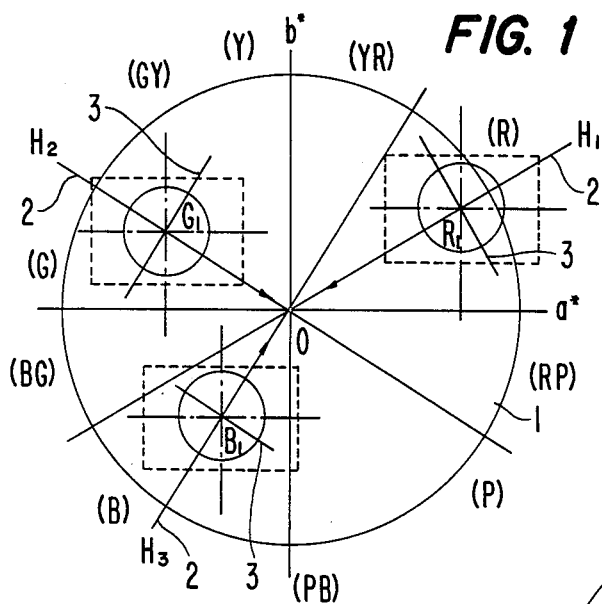
FIG. 1
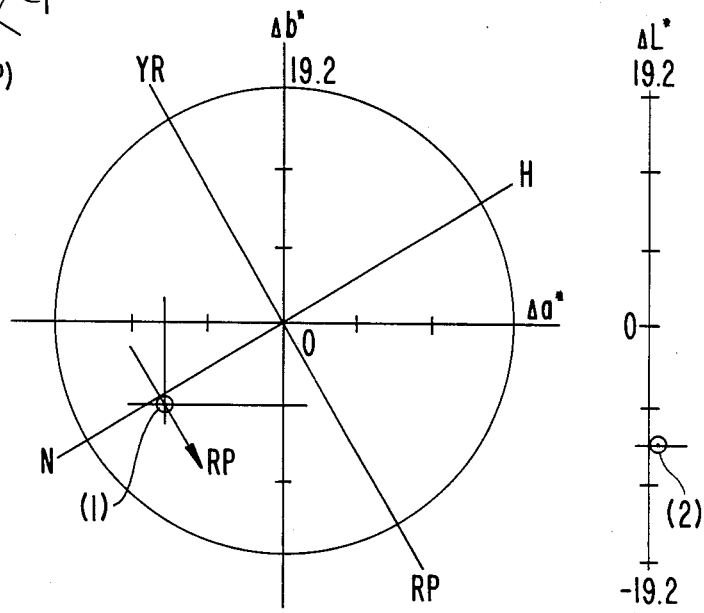
FIG. 3(a)
ΔL* Δa* Δb* DIAGRAM
FIG. 3(b)
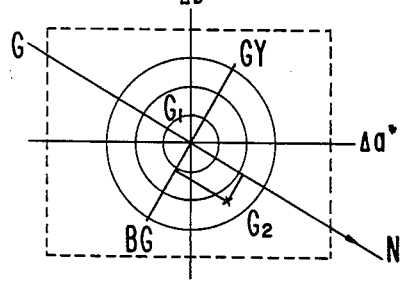
FIG. 2(b)
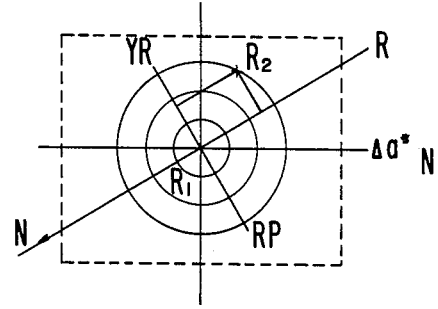
FIG. 2(a)
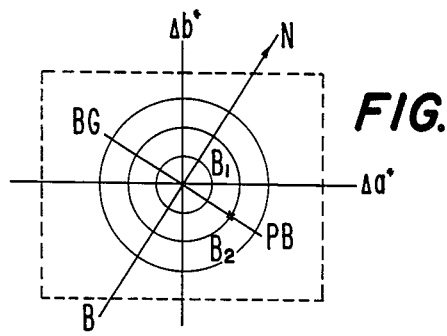
FIG. 2(c)

COLOR INDICATION COMPARISON METHOD

BACKGROUND OF THE INVENTION

1. Field of the Invention

The present invention relates to a color indication comparison method for indicating the color position relationship of two colors.

2. Description of the Prior Art

Heretofore, color indication methods have been established in "JIS Z 8722 Substance Color Measuring Method" for the system of three stimulus values XYZ and "JIS Z 8730 Color Difference Indication Method" for indicating the color difference between two colors.

The conventional system of color representation employed in those established methods describes a color as a point in a three-dimensional space. The prior art is described herein using the L*a*b color indication system by way of example, but the same method is employed also in other systems of color representation.

FIG. 1 shows orthogonal coordinations with the abscissa representing an a* value and the ordinate representing the b* value, and which together correspond to a planar chromaticity diagram in the form of a space of equal color difference. If the a* and b* values of a color to be indicated are determined, these values are plotted on FIG. 1 as the abscissa and ordinate values, respectively, to indicate the position of the color.

$R_1$ (red), $G_1$ (green), and $B_1$ (blue) are plotted as examples of indications of specific colors.

Ten hues (red, yellowish red, yellowish green, green, bluish green, blue, bluish purple, purple, and purplish red) depicted on the outer circle represent approximate positions of colors corresponding to the respective hues. A line 2 connected between each of such positions and the origin 0 are equal hue lines $OH$, $OH_2$, and $OH_3$ indicative of the corresponding equal hue.

In the past, therefore, a planar chromaticity diagram including the names of the ten hues depicted thereon as shown in FIG. 1 was prepared in advance, L*, a*, and b* values were calculated from the measured XYZ values for a particular color using conventional calculations, and they were plotted on FIG. 1 to obtain the coordinate position of the relevant color.

However, when two colors are located adjacent to each other, it is often difficult to make clear the relationship between those two colors.

While the planar chromaticity diagram 1 shown in FIG. 1 has coordinates for representing all ranges of colors, it is required in many cases to compare and determine a color deviation between two colors which cannot be appreciated at a glance. Thus, even if those two colors are plotted on the chromaticity planar diagram of FIG. 1, they are located too close to each other to practically distinguish between them.

Further, colors are essential elements for all types of industrial products and materials, and have vital importance particularly in the fields of paint, plastics, dyes, printing ink, etc. When handling colors in these fields, it is often required to find the color position relationship of two colors in order to determine, for example, in which direction a finished color deviates from a specific color, or in which direction the color has been changed due to the passage of time. The prior art has had difficulties in precisely finding such relationships.

For this reason, there has been a strong demand to develop a color indication comparison method which can distinguish a color deviation between two colors, even if the two colors to be compared differ by a very small color difference.

SUMMARY OF THE INVENTION

The present invention provides a color indication comparison which can easily distinguish a color deviation between two colors, even if those two colors differ by a very small color difference, and which can clearly, precisely compare and indicate the color position relationship between two colors in the whole of a planar chromaticity diagram.

BRIEF DESCRIPTION OF THE DRAWINGS

The invention will now be described in greater detail in connection with the accompanying drawings, in which:

FIG. 1 is a conventional chromaticity diagram;

FIGS. 2(a)–2(c) are target color diagrams according to the present invention; and FIGS. 3(a) and 3(b) are preferred embodiments of color diagrams according to the present invention.

DETAILED DESCRIPTION OF THE INVENTION

The present invention uses the following means to achieve the results described hereinbefore.

In the diagrams of 2(a), 2(b), and 2(c), the points $R_1$, $G_1$, and $B_1$ in FIG. 1 are assumed to be the origins of respective target colors with the abscissa representing $\Delta a^*$ and the ordinate representing $\Delta b^*$, which are the deviations of each target color from the origin 0 of FIG. 1, being indicated thereon.

$R_1$, $G_1$, and $B_1$ in FIGS. 2(a), 2(b), and 2(c) are positioned at the corresponding points on FIG. 1, respectively. Straight lines $OH_1$, $OH_2$, and $OH_3$ connecting the origin 0 in FIG. 1 with the points $R_1$, $G_1$, and $B_1$ are indicative of the same hues as $R_1$, $G_1$, and $B_1$, respectively, which are referred to as equal hue lines 2.

In FIG. 2(a) which depicts the vicinity of $R_1$ among $R_1$, $G_1$, and $B_1$ in FIG. 1, the line indicating a hue of the origin $R_1$ of the target color is designated at NR and the direction of N is toward the origin 0 of FIG. 1.

Likewise, in FIGS. 2(b) and 2(c), hues of the origins $G_1$, $B_1$ of the target colors are designated as NG, NB, respectively, and the direction toward the origin 0 is designated at N.

Also in FIGS. 2(a), 2(b), and 2(c), segments perpendicularly crossings the above hues lines are designated as YR-RP, GY-BG, and BG-PB, respectively, which represent equal saturation lines 3 approximately in the form of straight line loci obtained when only hues are varied with the same saturations as the colors corresponding to the origins $R_1$, $G_1$, and $B_1$ of the respective target colors.

Symbols on both ends of each segment are abbreviations of hues which correspond to the abbreviations for the ten hues in FIG. 1.

More specifically, because the colors represented by the origins $R_1$, $G_1$, and $B_1$ of the target colors in FIG. 2 are red (R), green (G), and blue (B), respectively, in the case of FIG. 2(a) by way of example, yellowish red (YR) is located on the left side of hue line OH, red and purplish red (RP) are located on the right side thereof, as will be apparent by superimposing the origins $R_1$ of the target value in FIG. 2 on the position of $R_1$ in FIG. 1. As a result, the segment in FIG. 2(a) is designated as YR-RP.

Likewise, the segment in FIG. 2(b) is designated at GY-BG from the relationship in FIG. 1, and that in FIG. 2(c) is designated as BG-PB.

The manner of using the diagrams will be described below for the case where the colors represented by respective points $R_2$, $G_2$, and $B_2$ in FIGS. 2(a), 2(b), and 2(c) with their $\Delta a^*$ and $\Delta b^*$ values differing by the amounts shown in the figures are assumed to be object colors to be compared with the target colors represented by the origins $R_1$, $G_1$, and $B_1$ thereof.

In FIG. 2 (a), looking at the component parallel to the hue line NR, the position of the object color $R_2$ is located opposite to direction N with respect to the color represented by the origin $R_1$ of the target color, whereby it will be seen that the object color $R_1$ has a higher saturation value than that of the color represented by the origin $R_1$ of the target color, because saturation becomes less toward an achromatic color, i.e. the direction of N.

Next, looking at the component parallel to the segment YR-RP, the object color $R_2$ is shifted toward the YR side with respect to the origin $R_1$ of the target color, whereby it will be seen that it is nearer to yellowish red (YR) than the color at the origin $R_1$ of the target color.

In the case of FIG. 2(b), it will be seen that the object color $G_2$ has a lower saturation value and is nearer to bluish green (BG) than the color at the origin $G_1$ of the target color.

In the case of FIG. 2(c), because the object color $B_2$ is located on the segment BG-PB, it will be seen that the object color $B_2$ has the almost same hue as but is nearer to bluish purple (PB) than the color at the origin $B_1$ of the target color.

In the case of FIG. 2(c), because the object color $B_2$ is located on the segment BG, it will be seen that the object color $B_2$ has the almost same hue as but is nearer to bluish purple (BP) that the color at the origin $B_1$ of the target color.

In this manner, by providing an equal hue line in the direction toward an achromatic color on the $\Delta a^*$-$\Delta b^*$ coordinates of FIG. 2, providing a segment perpendicular to the hue line at the origin of the target value, which segment constitutes an equal saturation line, and by designating the ends of the equal saturation line with the names of hues on both sides of the hue at the origin of the target value, it becomes possible to easily find the positional relationship between an object color to be compared and a target color at the origin of the target color diagram.

By using the $\Delta a^*$-$\Delta b^*$ planar diagrams as shown in FIG. 2, it is thus possible to find in which direction and by how much the object color deviates from the target colors for both hue and saturation among three color components (hue, saturation, and brightness).

On the other hand, as to brightness, because the $L^*$ value is a quantity indicating the degree of brightness, it is sufficient to directly compare the $L^*$ value $L^*1$ or the target value, with the $L^*$ value $L^*2$ of the object color so that the brightness difference $\Delta L^* = L^*2 - L^*1$ is obtained. This difference can also be obtained by depicting a $\Delta L^*$ axis with the target color located at the origin and then plotting the object color on the $L^*$ axis while taking into consideration whether the object color brightness is plus or minus relative to the target color brightness.

If the object color is plotted on the $\Delta L^*$ axis in the plus region with respect to the target color, it will be found that the object color is brighter. On the contrary, if plotted in the minus region, it can be directly read that the object color is darker.

An example of such a diagram including the $\Delta L^*$ axis is shown in FIG. 3b.

The present invention thus makes it possible to precisely compare and determine the deviation of an object color from a target color as to hue, saturation, and brightness, even if those colors differ by only very small color differences.

More specifically, by using the method according to the present invention, it becomes possible to indicate in which direction the color to be compared, i.e. the target color, is shifted with respect to the reference sample, i.e. the object color, for each of the hue, saturation, and brightness components, as well as to enable color adjustment by quantitatively calculating the difference from the reference value for each component and setting the reference value at the origin of coordinates so as to indicate the direction of such differences with respect to the reference value.

FIGS. 3a and 3b show concrete examples of diagrams used for putting the above-described method of the present invention into practice, which method will now be described in terms of practical operating procedures.

The color of the reference sample is measured using a conventional colorimeter or the like to obtain three stimulus values X, Y, and Z of that color, and then the values $L^*$, $a^*$, and $b^*$ are calculated therefrom using conventional calculations.

Next, the measured values of the reference sample are subjected to Munsell transformation to obtain the hue of the reference sample. Munsell transformation can be carried out by manual calculation using a diagram or by making use of a computer.

In case of using the diagram, as disclosed in "Section Diagram for Chromaticity indication" (Japanese Patent Laid-Open Application No. 56-50467) which was previously invented by the present inventors, a transformation chart is formed by plotting Munsell symbols at equal intervals on each of $a^*$ - $b^*$ planar chromaticity diagrams prepared for each step of brightness from V=1 to V=9, and then the $a^*$ and $b^*$ values of the measured sample are plotted on that chart, whereby the desired Munsell symbol can be read by interpolation based on the Munsell symbols surrounding the position of the measured sample.

In the case of using a computer, the relationship between Munsell symbols with hue and saturation sampled at equal intervals for each step of brightness from V=1 to V=9 and the corresponding Yxy values (calculated from $x = X/(X+Y+Z)$, $y = Y/(X+Y+Z)$ ) are stored therein as a table, and the desired Munsell symbol is retrieved from the Yxy values of the measured sample.

Assuming now that FIG. 3(a) is prepared with the reference sample located at the origin, then the hue line NH can be obtained as follows.

The inclination of line NH is determined by $b^*/a^*$ and the direction of N is determined from the sign of $a^*$ and $b^*$, i.e. whether they are plus or minus.

Even when the value of $b^*/a^*$ is the same, the direction toward N is leftward downward as shown in FIG. 3(a) when $a^* > 0$ and $b^* > 0$, while it is directed rightward upward, oppositely to FIG. 3(a), when $a^* < 0$ and $b^* < 0$.

When the inclination of $b^*/a^*$ is found, this value is transformed to $\Delta b^*/\Delta a^*$, which are plotted on FIG.

3(a), and the segment NH can then be drawn to Δb*, Δa* from the origin.

If the NH line is determined, N designates the direction toward an achromatic color and H is an abbreviation indicating the hue name. In the example of FIG. 3(a), there is obtained H=5.98R.

If NH is determined and the hue of H is found, the saturation line perpendicular to NH can now be drawn and the names of the hues on both sides of the hue of H are put on the respective ends of the orthogonal saturation line, thus resulting in the diagram of FIG. 3(a).

Thereafter, the color of a sample to be compared is measured in the same way and values L*, a*, and b* are obtained from values X, Y, and Z, and the differences ΔL*, Δa*, and Δb* from the corresponding values for the reference sample are obtained, and the results are plotted on FIGS. 3(a) and 3(b). At this time, because the magnitudes of ΔL*, a*, and b* are not constant, dependent on the amount of difference with respect to the reference sample, such magnitude is also automatically judged and the minimum n satisfying the equation of $D < 0.6 \times 2n$ (n=0, 1, 2 ... integer) where $D = \sqrt{\Delta a^{*2} + \Delta b^{*2}}$ is then obtained to determine the value at the outer limit of the scale of FIGS. 3(a) and 3(b).

FIGS. 3(a) and 3(b) show an example in which n equals 19.2. The scale lines are divided into thirds from the outer point 19.2 to the origin 0, i.e. with values 6.4 and 12.8 marked therealong in this example. The values of Δa* and Δb* are plotted in FIG. 3(a) with respect to the thus marked scale lines, thus resulting in a point (1) in FIG. 3(a).

Interpreting the point (1) of FIG. 3(a) similarly to that in the explanation of FIGS. 2(a)-2(c), it will be seen that the saturation of the sample to be compared has shifted nearer to N, and the hue has shifted slightly nearer to the purplish red (RP) than the reference sample at the origin.

For the L* value indicating brightness, the reference sample is assumed to located at the center 0 of the line of FIG. 3(b), and the scale line marks are the same way as employed in FIG. 3(a). In this case, which larger one of the scale values decided for ΔL* and D is used commonly.

This is for clarity of indication, because the deviations indicated on difference scales makes it hard to directly understand such indication. It is apparent from a glance that if the sample to be compared is located above the center 0, its color is brighter than that of the reference sample, while if below the center 0, its color is darker than that of the reference sample. In the illustrated example, the sample to be compared is indicated at a position (2).

The data in attached Table 1 are values converted from the XYZ values of the reference sample and the sample to be compared. The hue H=5.98R of the reference sample gives the value of H for the hue line NH. Based on this H value, the line YR-RP can be first determined.

The differences in the three components are then calculated as follows.

Brightness difference: $\Delta L^* = L^*_1 - L^*_0$

Saturation difference: $\Delta C^* = C^*_1 - C^*_0$ $$C^*_1 = \sqrt{a1^{*2} + b1^{*2}} \quad C^*_0 = \sqrt{a0^{*2} + b0^{*2}}$$

-continued

Color Difference $\Delta E^* = \sqrt{\Delta L^{*2} + \Delta a^{*2} + \Delta b^{*2}}$ $\Delta a^* = a^*_1 - a^*_0 \quad \Delta b^* = b^*_1 - b^*_0$ Hue difference: $H = \sqrt{\Delta E^{*2} - \Delta C^{*2} - \Delta L^{*2}}$ The indication of the color difference between the two colors is thus broken down into the three components of brightness difference, saturation difference and hue difference, i.e. *L: darker by 9.89, C: duller by 12.15, H: nearer to RP by 0.65. The position of the illustrated points (1) and (2) are thus represented by numerical values corresponding to the differences in the three components.

The above indication method including the required calculation can be arithmetically processed and displayed on a CRT, X-Y plotter, graphic printer, etc. for practical use.

As described in the above, by using the indication method as illustrated in FIGS. 3(a) and 3(b), it becomes possible to indicate visually in which direction the color of the sample to be compared is shifted with respect to the color of the reference sample, for each component, i.e. hue, saturation, and brightness, as well as to enable color adjustment by quantitatively calculating the difference of each component from the reference value for each component, and setting the reference value at the origin or coordinates to indicate the direction of such difference with respect to the reference value.

This method thus permits color management, including finding the direction of a color deviation, to be achieved more clearly and easily than the case of judging the color relationship based on merely the magnitude of color difference, etc.

TABLE 1

| Reference Sample |
| --- |
| L* = 39.50 |
| a* = 50.60 |
| b* = 28.88 |
| H = 5.98 R |
| Sample To Be Tested |
| L* = 29.61 |
| a* = 40.31 |
| b* = 22.38 |
| ΔL* = −9.89 |
| Δa* = −10.29 |
| Δb* = −6.50 |
| ΔE* = 15.68 |
| H = 6.71 R |

L: 9.89 (amount by which sample to be tested is darker with respect to lightness value L than reference sample)
C: 12.15 (amount by which sample to be tested is duller with respect to Chroma C than reference sample)
H: 0.65 (amount by which sample to be tested deviates with respect to Hue H from the direction RP)

What is claimed is:

1. A method of determining the color difference between two similar colors, comprising:
    determining the tristimulus values for a reference color with which another color is to be compared;
    providing a planar chromaticity diagram for the values other than brightness in which the values for the reference color are at the origin and the abscissa and ordinates of the diagram;
    determining the hue of the reference color and plotting on said diagram an equi-hue line;

determining the tristimulus values for the other color to be compared to the reference color and plotting the values other than brightness on said diagram;

plotting an equi-saturation line on said diagram perpendicular to said equi-hue line and extending through the origin;

plotting lines parallel to said equi-hue and equi-saturation lines through said position of the plotted values for said other color and extending across said equi-hue and equi-saturation lines, whereby the difference in the tristimulus values for the other color from the reference color are shown by measurements along said parallel lines; and providing a brightness line having the brightness value of the reference color at the center of the line with values of greater brightness on one side of the center and values of less brightness on the other side of the center, and plotting the brightness of the other color on said line, whereby the difference in brightness for the other color from the reference color is shown by measurement along the line.

* * * * *